April 22, 1924.

C. V. LLOYD ET AL 1,491,153

PERISCOPE

Filed June 29, 1922

Inventors.
C. V. Lloyd
E. J. Saul
By Egerton R. Case,
Atty.

Patented Apr. 22, 1924.

1,491,153

UNITED STATES PATENT OFFICE.

CHARLES VICTOR LLOYD AND EDWIN JOHN GAUL, OF STRATFORD, ONTARIO, CANADA.

PERISCOPE.

Application filed June 29, 1922. Serial No. 571,810.

*To all whom it may concern:*

Be it known that we, CHARLES VICTOR LLOYD and EDWIN JOHN GAUL, both subjects of the King of Great Britain, and both residing in Stratford, in the county of Perth, Province of Ontario, Canada, have jointly invented certain new and useful Improvements in Periscopes, of which the following is a specification.

Our invention relates to improvements in periscopes, and relates more particularly to periscopes used on the cabs of motor trucks, and the object of the invention is to provide a device of this character which can be installed on the cab of different types of motor trucks where there is likely to be a variation in the construction of the roof of the cab, and to permit the driver of the vehicle to have a clear view of traffic on the road behind him for varying distances within the range of the device, and in the following specification we shall describe a disclosure within our invention, and what we claim as new will be set forth in the claim forming part of this specification.

Figure 2:
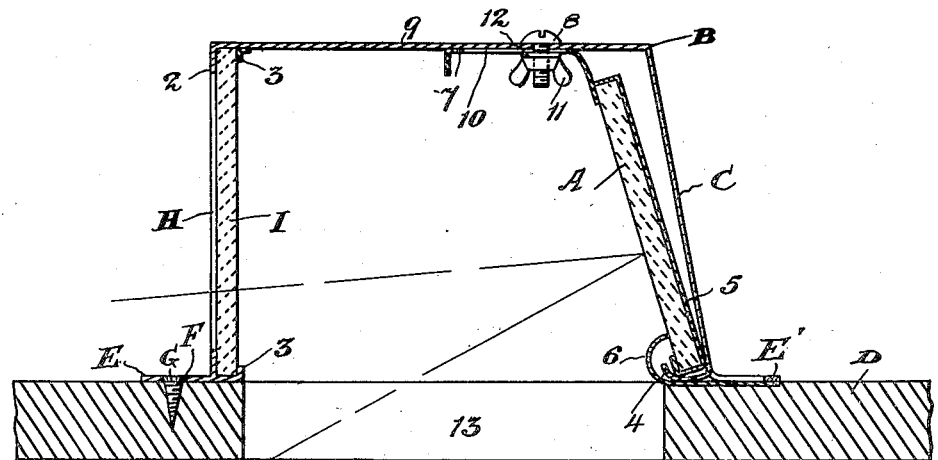
Figure 1:
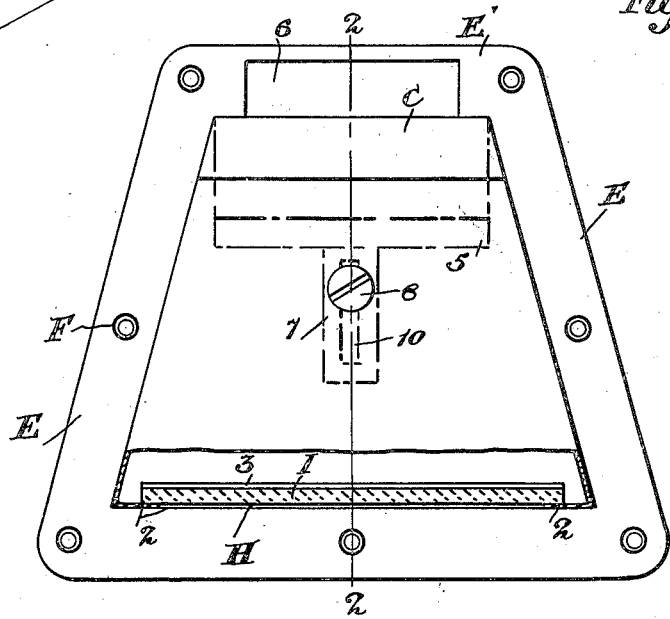

Fig. 1 is a plan view of our preferred form of periscope, with certain parts broken away to show construction, and Fig. 2 is a vertical longitudinal section on the line 2—2, Fig. 1, showing the periscope mounted on portion of the roof of the cab of a truck.

In the drawings, like characters of reference refer to the same parts.

The mirror A is adjustably mounted within the casing B the forward side C of which preferably slopes backwardly. This casing is suitably secured to the roof D of the cab: the means shown for this purpose comprises flanges E integrally formed with the casing B and surrounding all sides thereof, and provided with holes F into which the screws G are passed.

The rear side of the casing B is open as shown at H, and closing this opening against the weather is a sheet of transparent material I, preferably made of glass, and suitably held in place. A convenient way of holding this transparent sheet I in place is by providing the rear side with flanges 2, and interiorly associating with said casing means co-acting with the flanges in the form of strips 3, which strips retain the sheet I in contact with the flanges 2. The mirror A is adjustably mounted within the casing B in any suitable manner. We provide the following preferred means for adjustably supporting the mirror at its lower end, which means forms a seat: this means comprises a tongue 4 formed in any suitable manner. One way of making this tongue is by cutting it out of the front flange E', and bending it inwardly. The lower portion of the frame 5 rests in the tongue 4. 6 is a spring having a curved inward end which abuts against the mirror A as shown in Fig. 2 to keep the mirror from jumping out of the seat before-mentioned. This spring may be suitably secured in place underneath the tongue 4, and one way of securing it in place is by soldering it to the underside of the flange E'.

7 is an adjustable flexible slotted coupling secured to or forming part of the upper portion of the frame 5. 8 is a screw held in the top 9 of the casing B, and extending through the slot 10 formed in the coupling 7. 11 is a nut mounted on the screw 8 and interposed between this nut and the coupling 7 is a washer 12. Now by means of the opening 13 formed in the roof D, the driver has an unobstructed view of the image reflected in the mirror A.

By loosening the nut 11 the coupling 7 can be adjusted so as to adjust the angular inclination of the mirror A to suit the convenience of the driver.

Without further elaboration it will be understood by one skilled in the art that the adjustable feature of the mirror A gives the periscope a relatively large range, and permits the driver to have full view of the traffic of the road behind without materially distracting his attention from the road in front of him, and without the necessity of him having to turn in his seat or put his head out of the cab to view the following traffic.

Various changes in details of construction will suggest themselves that may be made without departing from the spirit of our invention.

While in the plan view we show the casing B substantially triangular in form, this being the preferred construction, we do not confine ourselves to this form.

In all respects the casing B is weatherproof.

The device is located on the roof of the cab above the driver's wheel so that it will not be necessary for the driver to move his head to the right or left in order to get a balanced view of the roadway at each side of the line of movement of the vehicle.

The use of this device obviates any necessity of the driver having to move his head to the right or left and gives him complete confidence in navigation and removes a source of eye confusion or strain.

What we claim is:

A periscope comprising a casing having an open bottom and a transparent rear wall, and having a backwardly sloped front wall; a seat located at the lower end of said front wall and interiorly of said casing; a mirror mounted at its lower end in said seat; a spring co-acting with said mirror at its lower end to keep it from jumping out of said seat, and a coupling connected with the upper end of said mirror and adapted to be adjustably coupled to the top of said casing, for the purpose specified.

CHARLES VICTOR LLOYD.
EDWIN JOHN GAUL.